(12) United States Patent
Mahlberg et al.

(10) Patent No.: US 12,000,532 B2
(45) Date of Patent: Jun. 4, 2024

(54) DEVICE TO SECURELY HOLD AND RELEASE HEADGEAR ALONG WITH OTHER PERSONAL PROTECTIVE EQUIPMENT

(71) Applicant: Hangen Innovations, LLC, Milledgeville, GA (US)

(72) Inventors: Nicholas Paul Mahlberg, Milledgeville, GA (US); Daniel Roper, Boston, MA (US); Katherine Mahlberg, Milledgeville, GA (US)

(73) Assignee: Hangen Innovations, LLC, Milledgeville, GA (US)

( * ) Notice: Subject to any disclaimer, the term of this patent is extended or adjusted under 35 U.S.C. 154(b) by 153 days.

(21) Appl. No.: 17/506,548

(22) Filed: Oct. 20, 2021

(65) Prior Publication Data

US 2022/0154878 A1 May 19, 2022

Related U.S. Application Data

(60) Provisional application No. 63/094,549, filed on Oct. 21, 2020.

(51) Int. Cl.
*F16M 13/06* (2006.01)
*A42B 3/00* (2006.01)
(Continued)

(52) U.S. Cl.
CPC ............. *F16M 13/06* (2013.01); *A42B 3/006* (2013.01); *A45F 5/00* (2013.01); *F16M 13/022* (2013.01);
(Continued)

(58) Field of Classification Search
CPC ........ F16M 13/04; F16M 13/06; F16M 13/02; F16M 13/022; A42B 3/006; A45F 5/00
See application file for complete search history.

(56) References Cited

U.S. PATENT DOCUMENTS 1,447,083 A * 2/1923 Jonas ..................... A47G 25/66
223/96
3,983,602 A * 10/1976 Barry .................. B43K 23/001
24/339
(Continued)

FOREIGN PATENT DOCUMENTS

| JP | 3188991 U | 2/2014 |
|---|---|---|
| JP | 3220943 U | 4/2019 |

(Continued)

OTHER PUBLICATIONS

"Personal Protective Equipment Holder", Unpublished US Design U.S. Appl. No. 29/755,563, Nicholas Paul Malberg, filed Oct. 19, 2020.

*Primary Examiner* — Tan Le
(74) *Attorney, Agent, or Firm* — Loginov & Associates, PLLC; William A. Loginov

(57) ABSTRACT

This invention provides a means of headgear storage and protection, along with other personal protective equipment, for use in sectors including, but not limited to: construction, mining, agriculture, utility, energy, recreational and military applications. This invention overcomes the disadvantages of the prior art by providing a device that can store multiple types of personal protective equipment at one time in a versatile and mobile form that can be used in any number of environments and can securely lock in and easily release headgear.

20 Claims, 22 Drawing Sheets

(51) Int. Cl.
*A45F 5/00* (2006.01)
*A47G 25/06* (2006.01)
*F16M 13/02* (2006.01)
*F16M 13/04* (2006.01)
*F16B 2/00* (2006.01)
*F16B 2/22* (2006.01)

(52) U.S. Cl.
CPC ............. *F16M 13/04* (2013.01); *A47G 25/06* (2013.01); *F16B 2/005* (2013.01); *F16B 2/22* (2013.01)

(56) References Cited

U.S. PATENT DOCUMENTS

| | | | |
|---|---|---|---|
| 4,044,928 A * | 8/1977 | Watanabe | A47G 25/483 24/561 |
| 5,411,189 A * | 5/1995 | Gouldson | A47G 25/48 223/91 |
| 6,477,744 B1 * | 11/2002 | Miles | B43K 23/002 24/3.12 |
| 10,383,385 B2 * | 8/2019 | Moreau | A44B 13/0029 |
| 2003/0126725 A1 * | 7/2003 | Housley | A47G 25/485 223/96 |
| 2016/0183620 A1 * | 6/2016 | Moreau | A42B 3/08 2/421 |
| 2022/0095820 A1 * | 3/2022 | Marshall | F16B 5/121 |

FOREIGN PATENT DOCUMENTS

| | | |
|---|---|---|
| KR | 100934346 B1 | 12/2009 |
| KR | 2020100002975 U | 3/2010 |
| KR | 1020120001218 A | 1/2012 |

* cited by examiner

DEVICE TO SECURELY HOLD AND RELEASE HEADGEAR ALONG WITH OTHER PERSONAL PROTECTIVE EQUIPMENT

RELATED APPLICATIONS

This application claims the benefit of U.S. Provisional Application Ser. No. 63/094,549, filed Oct. 21, 2020, entitled DEVICE TO SECURELY HOLD AND RELEASE HEADGEAR ALONG WITH OTHER PERSONAL PROTECTIVE EQUIPMENT, the entire disclosure of which is herein incorporated by reference.

FIELD OF THE INVENTION

This invention relates to headgear storage and protection, along with other personal protective equipment, for use in sectors including, but not limited to: construction, mining, agriculture, utility, energy, recreational and military applications.

BACKGROUND OF THE INVENTION

This invention serves to solve the problem of personal protective equipment getting misplaced or damaged due to the lack of a single, effective and versatile storage and transportation device. When workers finish using personal protective equipment such as headgear, gloves, earplugs, safety vests or safety glasses, the equipment is often misplaced on desks, in vehicles or elsewhere.

Prior art included creating simple hooks or wire racks for headgear that could be fitted for use in cars or in an office. The disadvantages of the prior art compared to this invention are primarily the inability of prior art to mechanically lock in and secure headgear when stored, the lack of versatility and mobility when it comes to storing personal protective equipment, and the lack of being able to store multiple types of personal protective equipment at one time.

SUMMARY OF THE INVENTION

This invention overcomes the disadvantages of the prior art by providing a device that can store multiple types of personal protective equipment at one time in a versatile and mobile form that can be used in any number of environments, and can securely hold and easily release headgear.

The invention accomplishes the above in a number of ways. Importantly, the structure and layout of the invention features allow for headgear to load into the invention easily and allow for loaded headgear to become securely locked into the invention once loaded. The same headgear can be easily released via reasonable manual force, making for convenient storage of headgear. The invention also includes other features such as a spring-loaded clip, side glasses holders and hollow body. These can be used to store personal protective equipment including, but not limited to: gloves, vests, glasses and earplugs at any given time. Furthermore, the invention is compact and light enough to be transferred from offices, vehicles or elsewhere, and can be used in conjunction with magnets, hooks, loops or clips in order to hang from any number of viable surfaces or hanging means.

BRIEF DESCRIPTION OF THE DRAWINGS

The invention description below refers to the accompanying drawings, of which.

DETAILED DESCRIPTION

Figure 1:
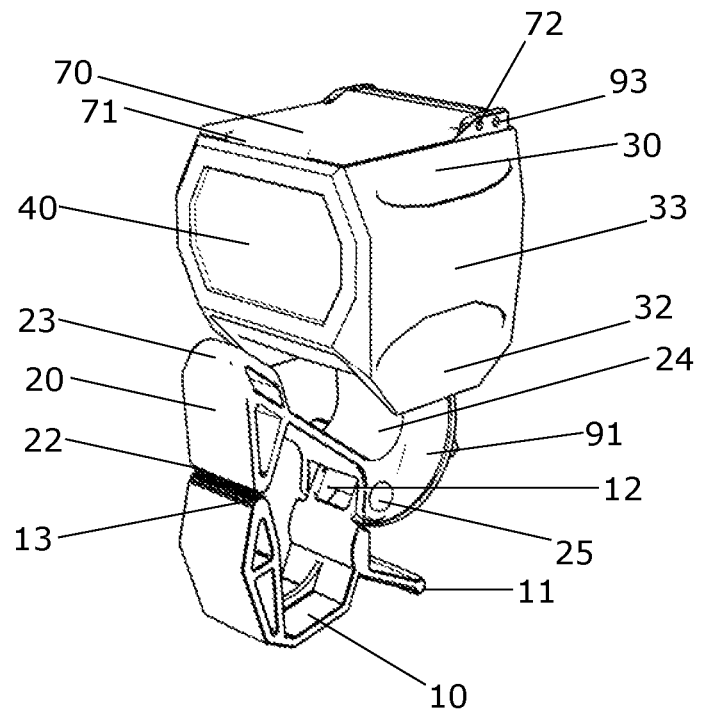
FIG. 1 is a front/side isometric view of the invention with the Hanging Implement folded, and the Top Of Body closed
Figure 2:
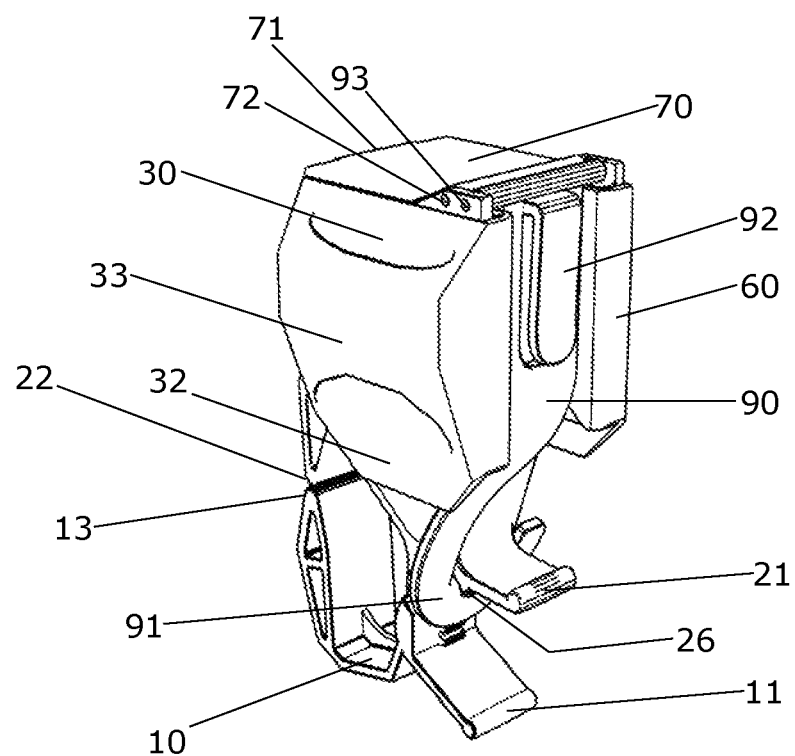
FIG. 2 is a back/side isometric view of the invention with the Hanging Implement folded, and the Top Of Body closed
Figure 3:
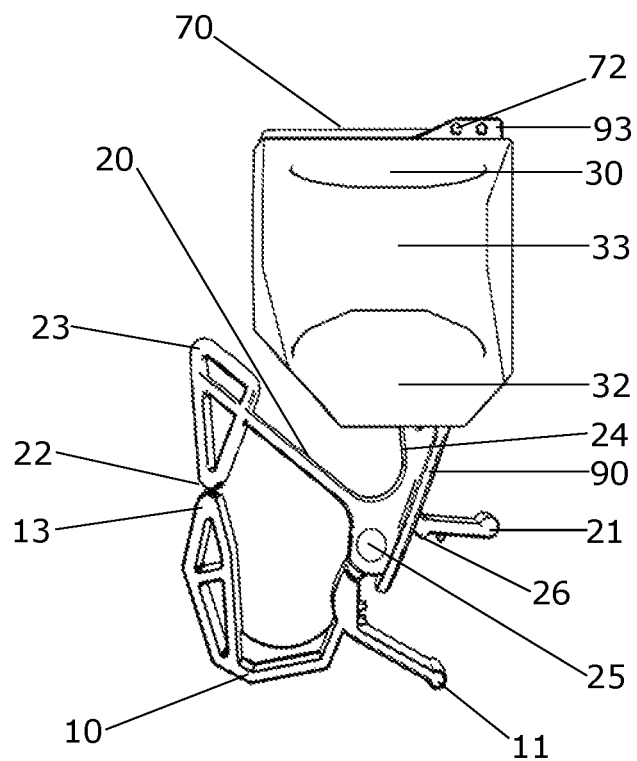
FIG. 3 is a side-facing view of the invention with the Hanging Implement folded, and the Top Of Body closed
Figure 4:
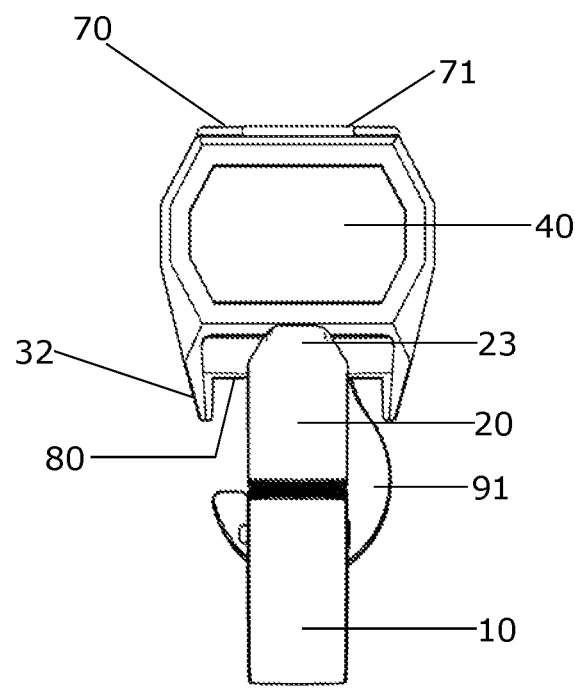
FIG. 4 is a front-facing view of the invention with the Hanging Implement folded, and the Top Of Body closed
Figure 5:
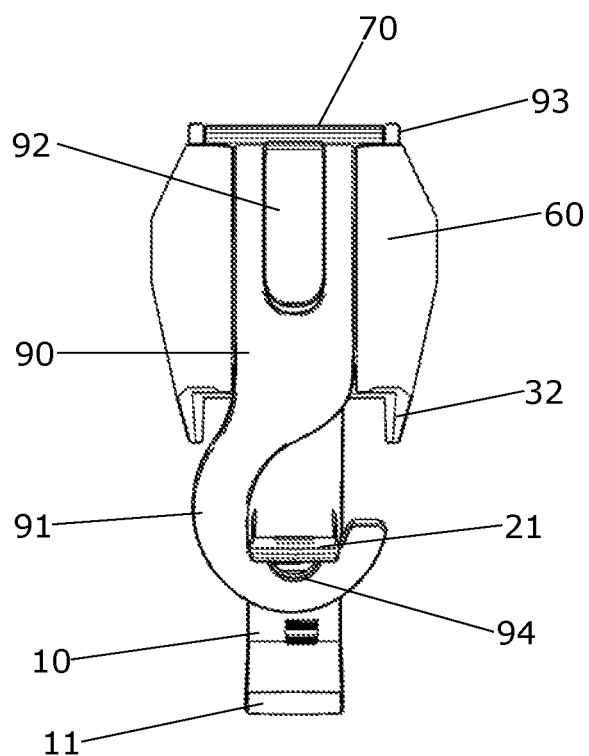
FIG. 5 is a rear-facing view of the invention with the Hanging Implement folded, and the Top Of Body closed
Figure 6:
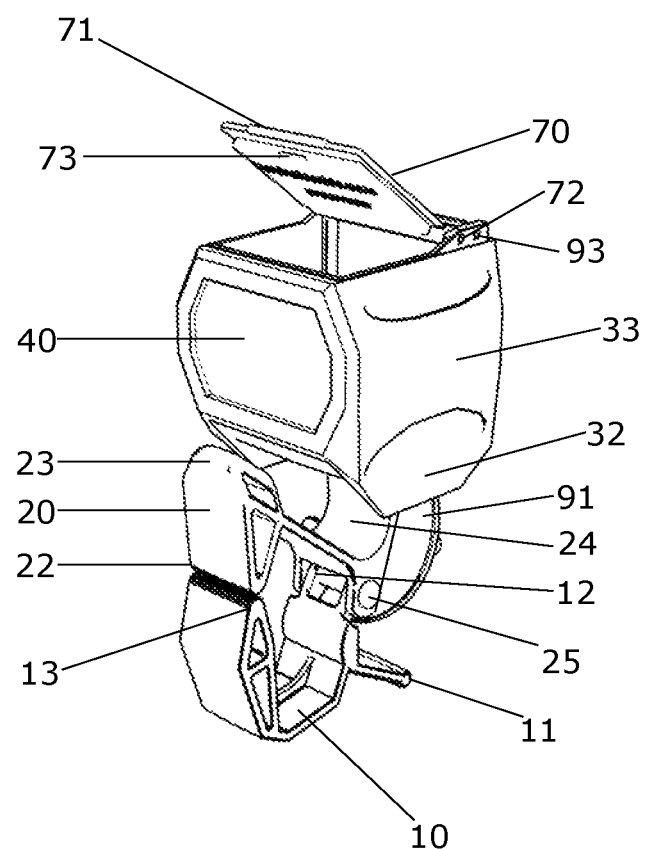
FIG. 6 is a front/side isometric view of the invention with the Hanging Implement folded, and the Top Of Body open
Figure 7:
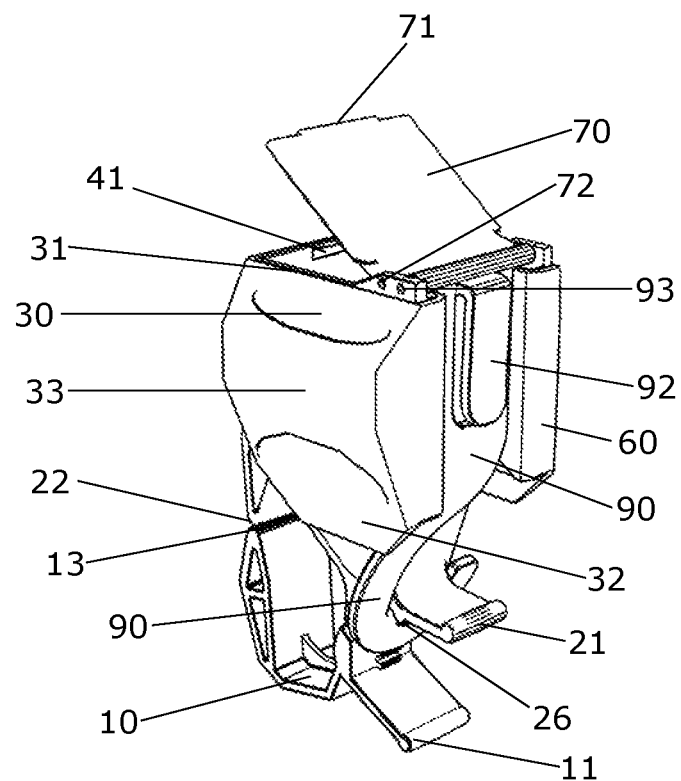
FIG. 7 is a back/side isometric view of the invention with the Hanging Implement folded, and the Top Of Body open
Figure 8:
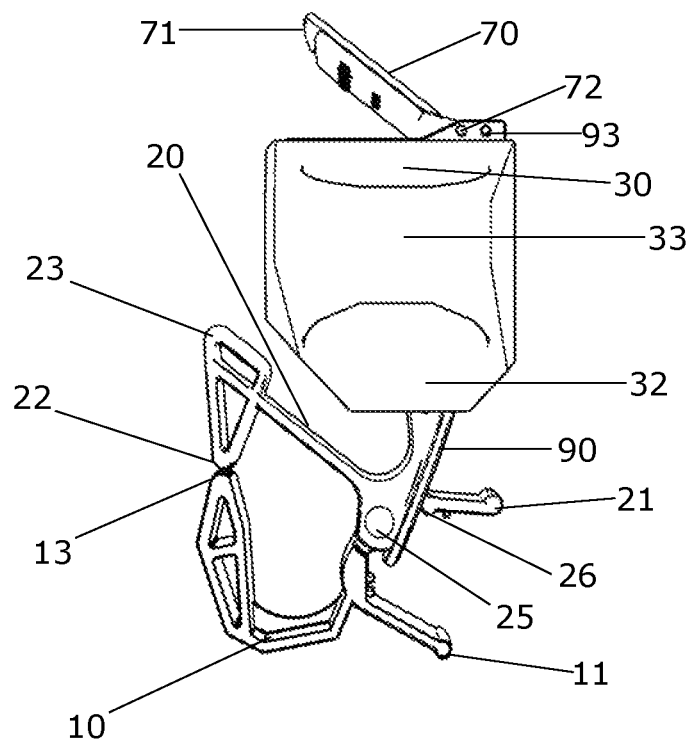
FIG. 8 is a side-facing view of the invention with the Hanging Implement folded, and the Top Of Body open
Figure 9:
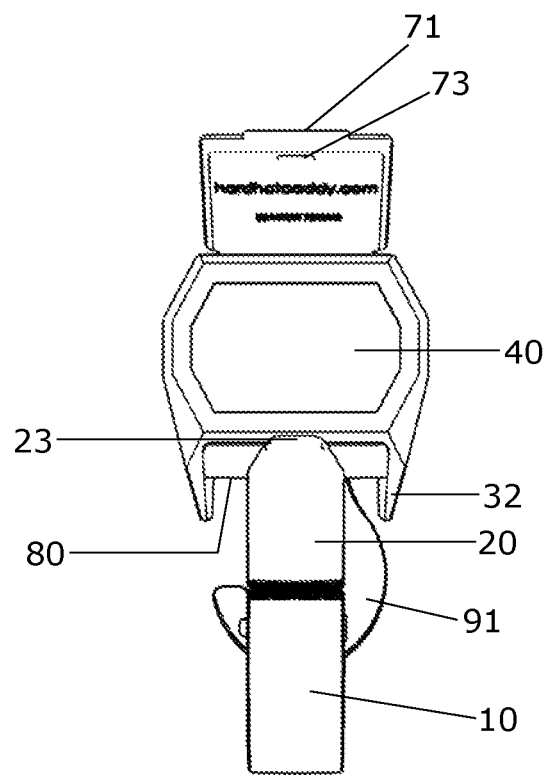
FIG. 9 is a front-facing view of the invention with the Hanging Implement folded, and the Top Of Body open
Figure 10:
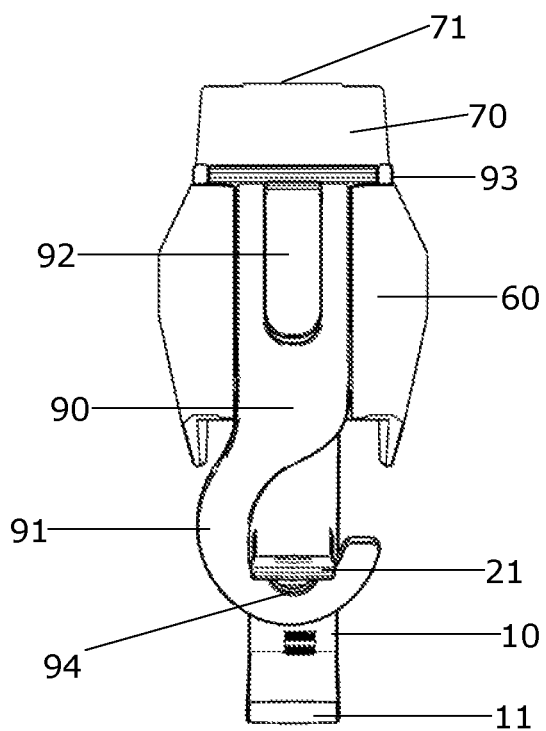
FIG. 10 is a rear-facing view of the invention with the Hanging Implement folded, and the Top Of Body open
Figure 11:
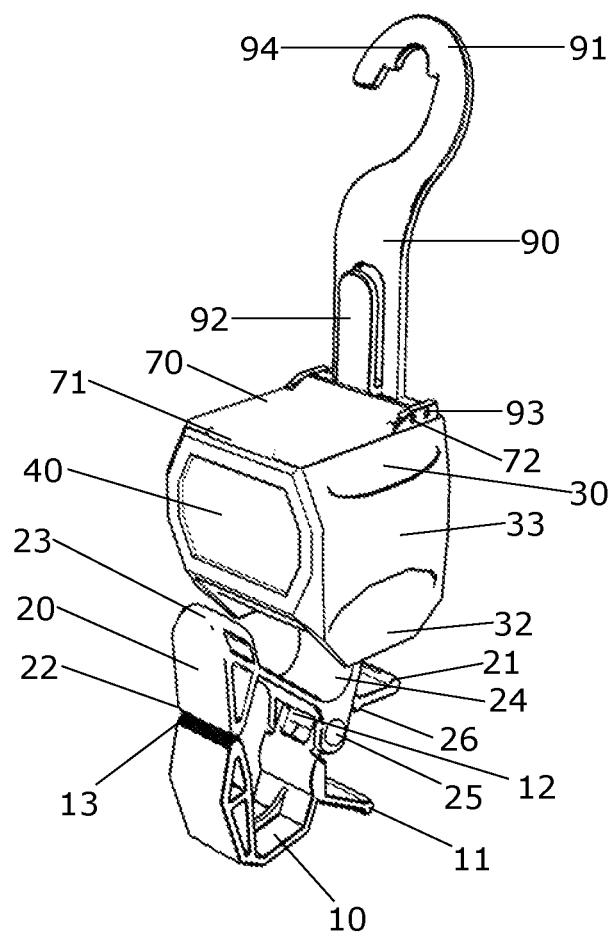
FIG. 11 is a front/side isometric view of the invention with the Hanging Implement unfolded, and the Top Of Body closed
Figure 12:
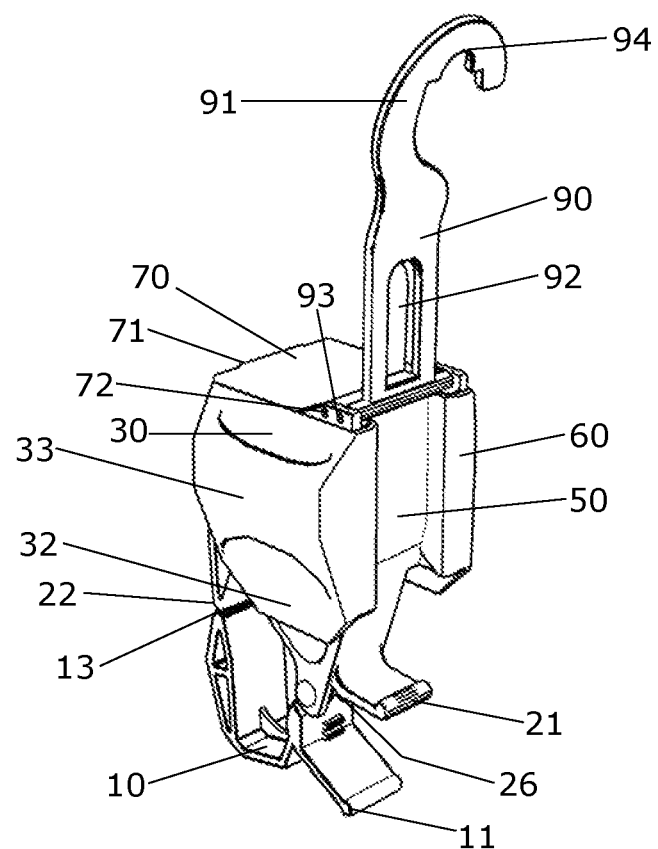
FIG. 12 is a back/side isometric view of the invention with the Hanging Implement unfolded, and the Top Of Body closed
Figure 13:
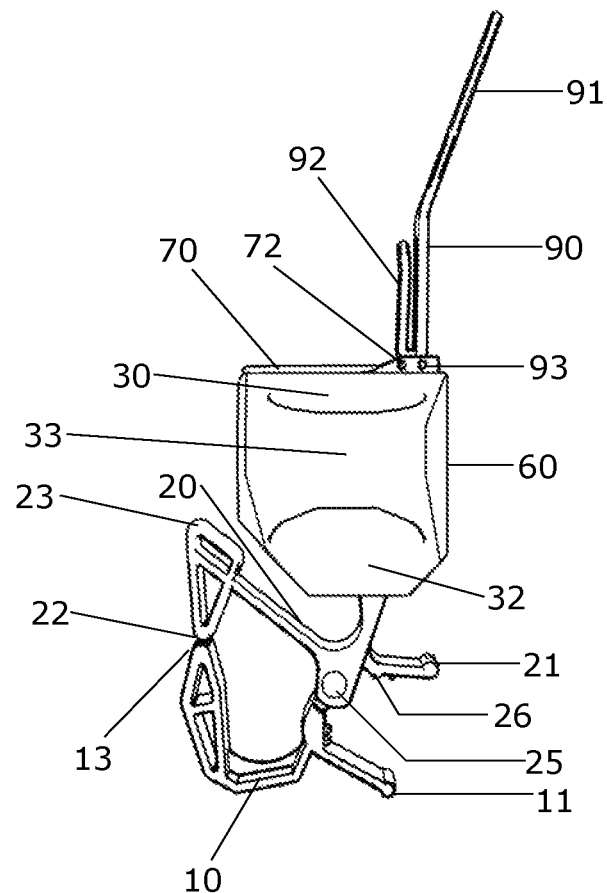
FIG. 13 is a side-facing view of the invention with the Hanging Implement unfolded, and the Top Of Body closed
Figure 14:
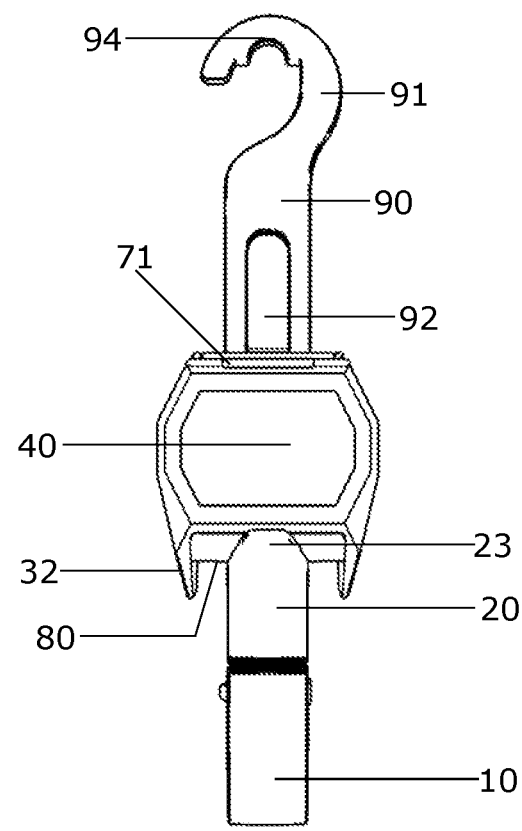
FIG. 14 is a front-facing view of the invention with the Hanging Implement unfolded, and the Top Of Body closed
Figure 15:
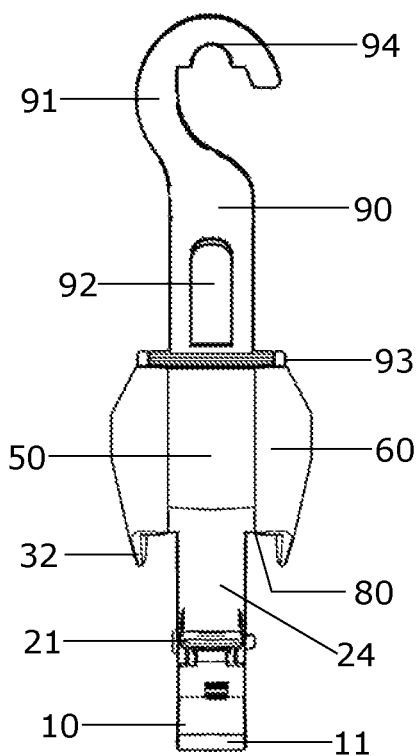
FIG. 15 is a rear-facing view of the invention with the Hanging Implement unfolded, and the Top Of Body closed
Figure 16:
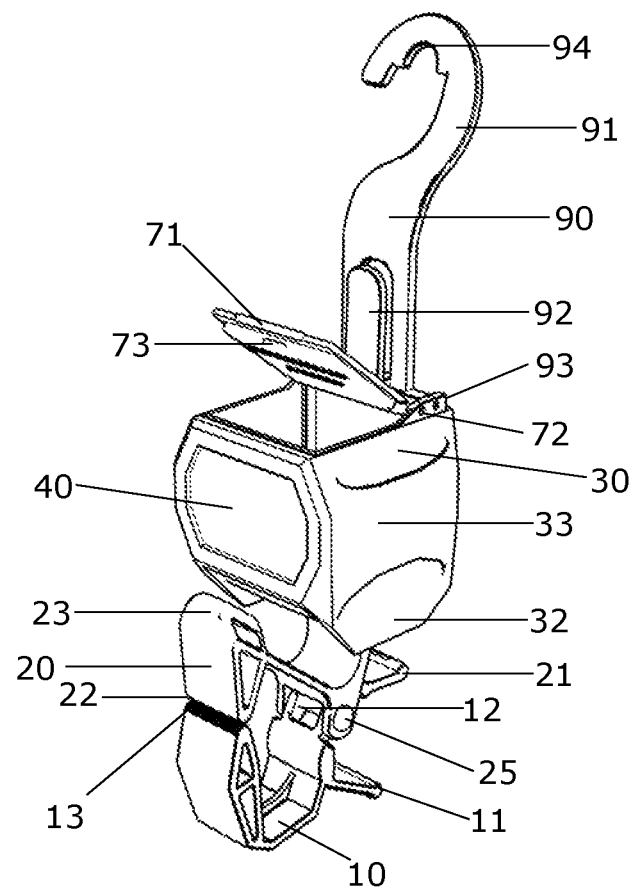
FIG. 16 is a front/side isometric view of the invention with the Hanging Implement unfolded, and the Top Of Body open
Figure 17:
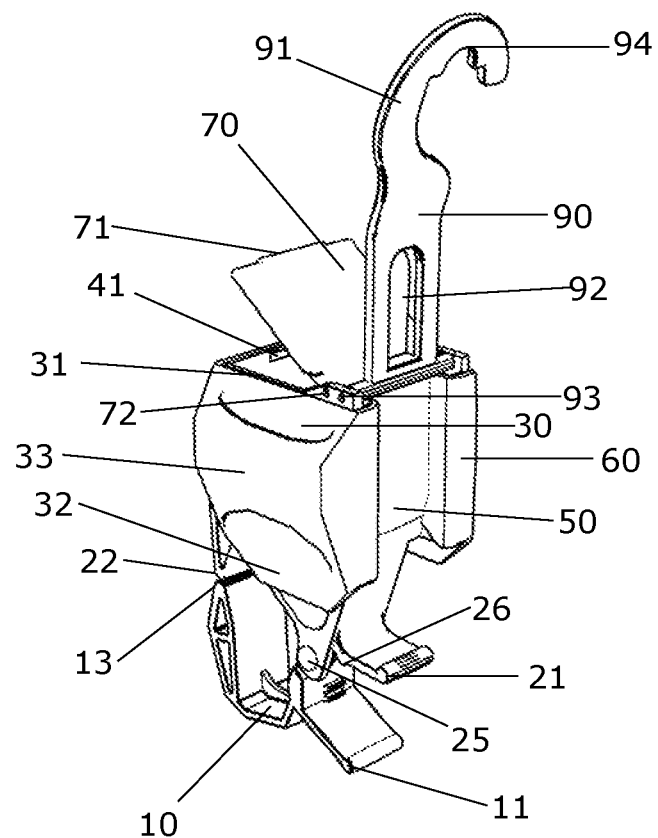
FIG. 17 is a back/side isometric view of the invention with the Hanging Implement unfolded, and the Top Of Body open
Figure 18:
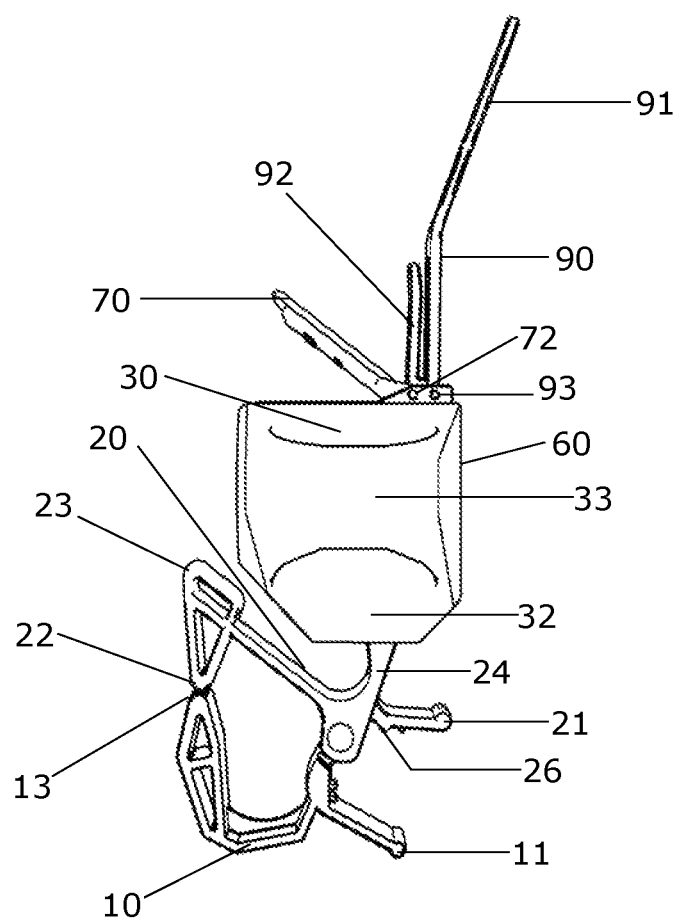
FIG. 18 is a side-facing view of the invention with the Hanging Implement unfolded, and the Top Of Body open
Figure 19:
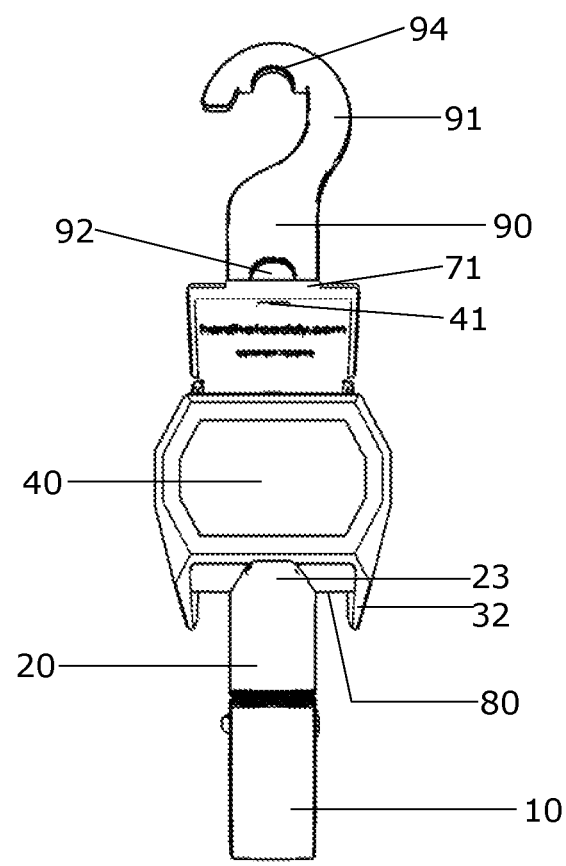
FIG. 19 is a front-facing view of the invention with the Hanging Implement unfolded, and the Top Of Body open
Figure 20:
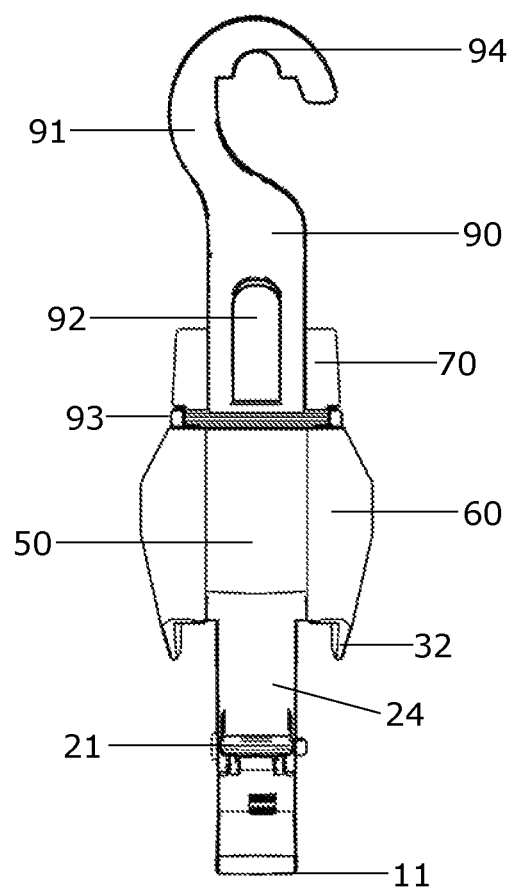
FIG. 20 is a rear-facing view of the invention with the Hanging Implement unfolded, and the Top Of Body open.
Figure 21:
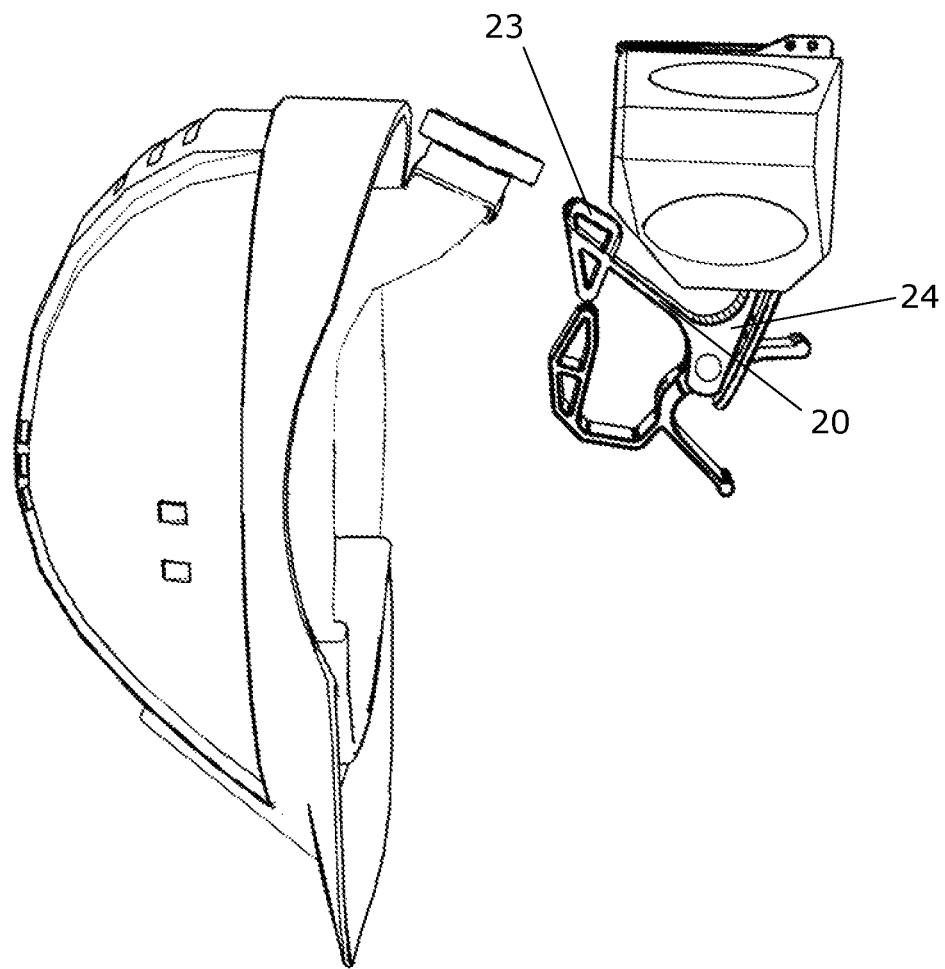
FIG. 21 is a side-facing view of an exemplary storage device in preparation for engagement with headgear.
Figure 22:
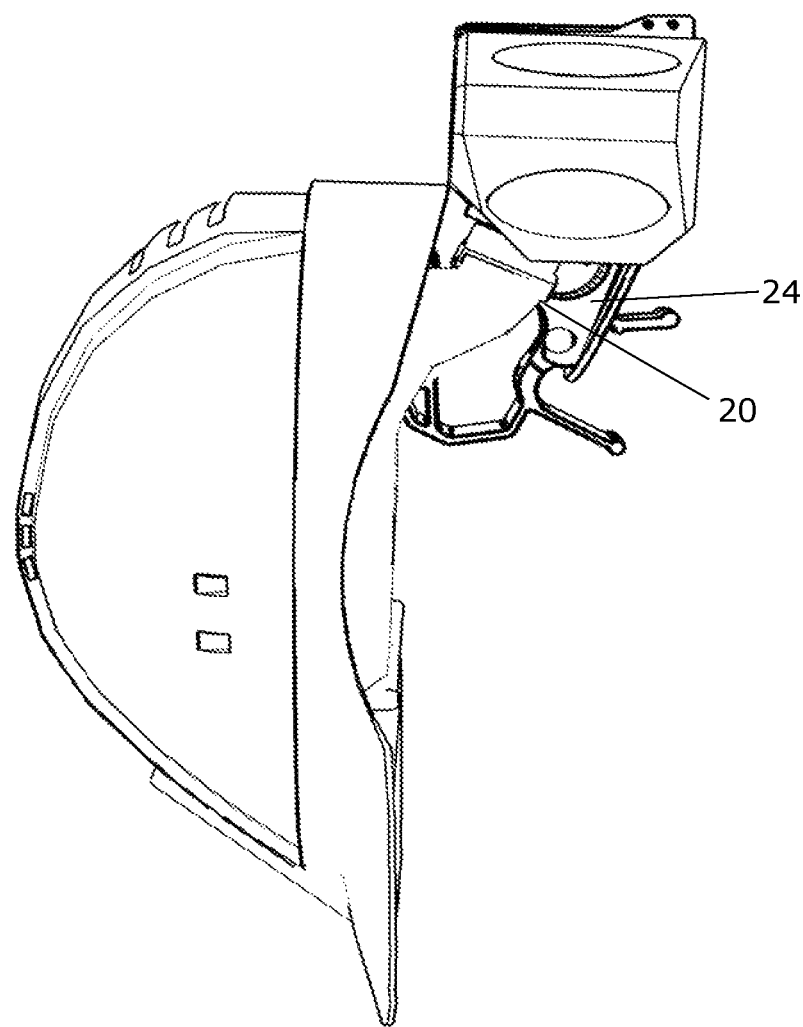
FIG. 22 is a side-facing view of an exemplary storage device engaged with headgear.

The invention, with components labeled in FIG. 1 through FIG. 22, is described in the following.

The Lower Mandible (10) serves as half of the clipping means and is further comprised of the Lower Mandible Press (11), Lower Mandible Pin Holes (12), and Lower Mandible Teeth (13). The bottom of the Lower Mandible is sufficiently curved away from the Upper Mandible (20) to allow for material loaded between the Lower Mandible Teeth (13) and Upper Mandible Teeth (22) to have a place to rest while loaded. The space between the top of the Upper Mandible (20) and the bottom of the Lower Mandible (10) is large enough to accommodate a variety of large safety gloves.

The Lower Mandible Press (11) extends from the Lower Mandible (10) in an ergonomic fashion, allowing for the Lower Mandible (10) to be opened and released by hand when used in conjunction with the Upper Mandible Hold (21).

The Lower Mandible Pin Holes (12) line up with the Upper Mandible Pin Holes (25). A pin passes through all four holes, holding the Lower Mandible (10) and Upper Mandible (20) together. A spring between the two mandibles keeps the Lower Mandible Teeth (13) and Upper Mandible Teeth (22) pressed together with some force.

The Lower Mandible Teeth (13) press against the Upper Mandible Teeth (22), and serve as an edge to grip various materials loaded between the two mandibles together.

The Upper Mandible (20) serves as half of the clipping means, and also serves to contain and release headgear. It is comprised of the Upper Mandible Hold (21), Upper Mandible Teeth (22), Upper Mandible Lip (23), Upper Mandible Stem (24), Upper Mandible Pin Holes (25), and Hook Hold (26).

The Upper Mandible Hold (21) extends in an ergonomic fashion from the Upper Mandible (20). When used in conjunction with the Lower Mandible Press (11), it can open the spring-loaded Lower Mandible (10), releasing any materials loaded between the two mandibles. The space between the top of the Upper Mandible (20) and the bottom of the Lower Mandible (10) is large enough to accommodate large safety gloves of any variety.

The Upper Mandible Teeth (22) press against the Lower Mandible Teeth (13) and serve as an edge to grip various materials loaded between the two mandibles together.

The Upper Mandible Lip (23) is located at the end of the Upper Mandible (20) furthest from the Upper Mandible Stem (24). It is comprised of two faces: one curvilinear facing away from the invention, and one either angled or curvilinear facing towards the invention. When headgear is loaded in the invention, the portion of the headgear band with the adjustment knob (or the back of the headgear band) is forced against the outward-facing curvilinear face of the Upper Mandible Lip (23). This flexes the Upper Mandible (20) down away from the Bottom Of Body (80), allowing the adjustment knob (or back of the headgear band) to fit into the space between the Upper Mandible (20), the Bottom Of Body (80), and the two Side Wings (32), putting the headgear into a secure locked position. When releasing the headgear from that locked position, a gentle twisting motion applied to the headgear forces the band into the inside-facing curvilinear or angled face of the Upper Mandible Lip (23). This flexes the Upper Mandible (20) down away from the Bottom Of Body (80), and the headgear adjustment knob (or back of the headgear band) slides out from the space between the Upper Mandible (20), the Bottom Of Body (80), and the two Side Wings (32), releasing the headgear. Once the headgear is released, the Upper Mandible (20) is no longer flexed downwards, and it returns to its original form.

The Upper Mandible Stem (24) extends up from the top surface of the Upper Mandible (20) up to the body of the invention.

The Upper Mandible Pin Holes (25) line up with the Lower Mandible Pin Holes (12). A pin passes through all four holes, holding the Lower Mandible (10) and Upper Mandible (20) together. A spring between the two mandibles keeps the Lower Mandible Teeth (13) and Upper Mandible Teeth (22) pressed together with some force.

The Hook Hold (26) is on the underside of the Upper Mandible Hold (21), and is a protrusion that is used to hold the Hanging Implement (90) in place when in the folded position. When the Hanging Implement (90) is moved into the folded position, the Hook (91) pushes against the Hook Hold (26), flexing the Upper Mandible Hold (21) sufficiently to allow the Hook (91) to move past the Hook Hold (26). Once the Hook (91) is past the Hook Hold (26), the Upper Mandible Hold (21) is no longer flexed and the Hook Hold Acceptor (94) locks in with the Hook Hold (26). The Hanging Implement (90) can be released from the folded position by applying force to the Upper Mandible Hold (21), allowing for the Hook Hold Acceptor (94) to separate from the Hook Hold (26).

The Side Of Body (30) is further comprised of the Side Body Walls (31), the Side Wings (32), and the Glasses Holders (33).

The Side Body Walls (31) constitute two of the walls that make up the hollow body of the invention, which can be used for article storage.

The Side Wings (32) extend down from the Side Body Walls (31), and prevent the adjustment knob on a headgear band (or back of the headgear band) from falling out of either side of the invention. The edges of the Side Wings (32) slope upwards towards the front of the invention, allowing the adjustment knob on a headgear band (or back of the headgear band) to be released towards the front on the invention when the Upper Mandible Lip (23) is flexed with a force in the form of a twisting motion applied to the headgear.

The Glasses Holders (33) extend outwards from the Side Body Walls (31), and have a curvilinear edges which keeps folded glasses hanging from the geometric center of the curve. Optionally, the Glasses Holders (33) can have a rubber or similar coating in order to diminish or silence vibration or movement of glasses in the Glasses Holders (33).

The Front Of Body (40) includes the Lid Slot (41), and constitutes one of the walls that make up the hollow body of the invention, which can be used for article storage.

The Lid Slot (41) is a slot on the inside face of the Front of Body (40) which accepts the Lid Locking Fixture (73).

The Back Of Body (50) constitutes one of the walls that make up the hollow body of the invention, which can be used for article storage. Optionally, the back of the body can be curved to ergonomically fit against the hip of a user, or can be flat.

The Back Body Spacers (60) are hollow rectangular prisms that run vertically along each side of the Back Of Body (50), providing space for the Hanging Implement (90) to fold down without extending further out the back than the Back Body Spacers (60). The Back Body Spacers (60) can optionally have magnets inside of them, allowing for the device to affix to various magnetic metal surfaces.

The Top Of Body (70) opens to reveal the hollow body of the invention, which can be used for article storage, and is further comprised of the Opener Edge (71), the Top Of Body Hinge (72), and the Lid Locking Fixture (73).

The Opener Edge (71) is on the edge of the Top Of Body (70) opposite of the Top Of Body Hinge (72), and allows the user to easily release the Lid Locking Fixture (73) in order to open the Top Of Body (70).

The Top Of Body Hinge (72) is at the edge of the Top Of Body (70) and the Back Of Body (50), and serves as the axis around which the Top Of Body (70) rotates when opening and closing.

The Lid Locking Fixture (73) allows the Top Of Body (70) to lock into the Lid Slot (41) when the Top Of Body (70) is closed. When force is applied to the Top Of Body (70) at the Opener Edge (71) in an opening motion, the Lid Locking Fixture (73) releases, allowing the Top Of Body (70) to open.

The Bottom Of Body (80) constitutes the bottom of the hollow body of the invention, which can be used for article storage. It also serves to keep an adjustment knob on the band (or back of the headgear band) of headgear in place when headgear is loaded into the invention.

The Hanging Implement (90) is comprised of the Hook (91), the Clip (92), the Hook Hinge (93) and the Hook Hold Acceptor (94).

The Hook (91) is attached to the body of the invention at the Hook Hinge (93) and allows the device to hang from a variety of means and/or surfaces when in the unfolded position.

The Clip (92) can be used to clip the device to one's person when the Hanging Implement (90) is in the folded position.

The Hook Hinge (93) allows for the Hanging Implement (90) to rotate from the unfolded position to the folded position and is located at the back of the Top Of Body (70).

The Hook Hold Acceptor (94) is carved into the Hook (91) and allows for the Hanging Implement (90) to lock into place via the Hook Hold (26) when in the folded position.

The invention can be used to hang from a hook, peg, headrest, a user's person, or any other number of viable surfaces and hangings. Headgear is loaded into the device by forcing the adjustment knob (or back of the headgear band) of the headgear against the outward-facing curvilinear face of the Upper Mandible Lip (23). This flexes the Upper Mandible (20) down away from the Bottom Of Body (80), allowing the adjustment knob (or back of the headgear band) to fit into the space between the Upper Mandible (20), the Bottom Of Body (80), and the two Side Wings (32) putting the headgear into a secure locked position. When releasing the headgear from that locked position, a gentle twisting motion applied to the headgear forces the band into the inside-facing curvilinear or angled face of the Upper Mandible Lip (23). This flexes the Upper Mandible (20) down away from the Bottom Of Body (80), and the headgear adjustment knob (or back of the headgear band) slides out from the space between the Upper Mandible (20), the Bottom Of Body (80), and the two Side Wings (32), releasing the headgear. Once the headgear is released, the Upper Mandible (20) is no longer flexed downwards, and it returns to its original form. Safety glasses are loaded into the two Glasses Holders (33) on either side of the invention, earplugs or other articles are stored in the hollow body of the invention, and safety gloves, reflective vests or other materials are loaded between the spring-loaded Upper Mandible (20) and Lower Mandible (10). The invention as a whole serves to securely and efficiently hold and release headgear along with other forms of protective personal equipment.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent).

What is claimed is:

1. A storage device, comprising:
an upper mandible comprising upper mandible teeth;
a lower mandible comprising lower mandible teeth configured to press against the upper mandible teeth to secure an article therebetween; and
a body defining at least one side of body, a bottom of body, and a top of body, a hook for attaching the body to a hanging support,
wherein the upper mandible and the lower mandible are constructed and arranged to removably engage a rear band and adjustment knob of headgear, and
wherein the at least one side of body comprises a glasses holder extending outwardly from side body walls defined by the at least one side of body.

2. The storage device of claim 1, wherein a bottom of the lower mandible is curved away from the upper mandible to allow the article loaded between the upper mandible teeth and lower mandible teeth to rest while loaded.

3. The storage device of claim 2, wherein the upper mandible and lower mandible defined a space therebetween configured to accommodate at least one of: safety gloves.

4. The storage device of claim 1, wherein:
the upper mandible defines an upper mandible hold and the lower mandible defines a lower mandible press that allows for a spring force that presses the lower mandible teeth against the upper mandible teeth to be overcome and the material to be released.

5. The storage device of claim 1, wherein:
the upper mandible defines an upper mandible lip comprising two faces, with a first face being curvilinear and facing outwardly and a second face being angled or curvilinear and facing inward.

6. The storage device of claim 5, wherein the upper mandible lip flexes downwardly and away from the bottom of body such that a portion of the headgear fits in a space defined between the bottom of body, the upper mandible, and two side wings of the body and the portion of the headgear presses against the first face of the upper mandible lip.

7. The storage device of claim 6, wherein the headgear is removable from the storage device by a twisting motion such that the portion of the headgear engages with the second face of the upper mandible lip and the portion of the headgear slides out from the space defined between the bottom of body, the upper mandible, and two side wings of the body such that the upper mandible lip unflexes upwardly.

8. The storage device of claim 1, wherein the glasses holder at least one of (a) defines curvilinear edges that keep folded glasses hanging from a geometric center of a curve defined by the curvilinear edges, and (b) comprises a rubber coating configured to diminish or silence vibration or movement of the folded glasses in the glasses holder.

9. The storage device of claim 1, wherein the body defines a front of body and a back of body.

10. The storage device of claim 9, wherein body is hollow and defines a space for article storage between the top of body, bottom of body, the front of body, and the back of body and the at least one side of the body.

11. A storage device, comprising:
an upper mandible comprising upper mandible teeth;
a lower mandible comprising lower mandible teeth configured to press against the upper mandible teeth to secure an article therebetween; and
a body defining at least one side of body, a bottom of body, and a top of body,
wherein the body defines a front of body and a back of body,
wherein body is hollow and defines a space for article storage between the top of body, bottom of body, the front of body, and the back of body and the at least one side of the body,
wherein the top of body opens and rotates about a top of body hinge, allowing access to the space for article storage, wherein the space for article storage is configured to receive earplugs.

12. The storage device of claim 1, further comprising a hanging implement having a hook, the hook being hingedly mounted and being rotatable between a folded position in which a hook hold acceptor of the hook engages a hook hold and an unfolded position in which the hook is configured to hang from a surface.

13. The storage device of claim 12, wherein the surface comprises one of a mounting hook, a peg, a headrest, or a hanging.

14. The storage device of claim 12, wherein the hanging implement comprises a clip configured to clip the storage device to a user.

15. A storage device, comprising:
an upper mandible comprising upper mandible teeth;
a lower mandible comprising lower mandible teeth configured to press against the upper mandible teeth to secure an article therebetween; and
a body defining at least one side of body, a bottom of body, and a top of body;
a hanging implement having a hook, the hook being hingedly mounted and being rotatable between a folded position in which a hook hold acceptor of the hook engages a hook hold and an unfolded position in which the hook is configured to hang from a surface,
wherein body defines a back of body comprising back of body spacers, providing space for the hanging implement to move from the unfolded position to the folded position.

16. The storage device of claim 15, wherein the back of body spaces comprise one or more magnets configured to magnetically engage with a magnetic metal surface.

17. The storage device of claim 1, wherein the article comprises one of: safety gloves, or a reflective vest.

18. A storage device, comprising:
an upper mandible comprising upper mandible teeth;
a lower mandible comprising lower mandible teeth configured to press against the upper mandible teeth to secure at least one first article therebetween, the at least one article comprising at least one of safety gloves or a reflective vest; and
a body defining at least one side of body, a bottom of body, a top of body, a front of body, and a back of body, wherein the body is hollow and defines a space for receiving at least one second article, the at least one second article comprising earplugs;
wherein the body comprises a glasses holder extending outwardly from side body walls defined by the at least one side of body,
wherein the upper mandible defines an upper mandible lip comprising a first outwardly facing curvilinear face such that the upper mandible lip flexes downwardly and away from the bottom of body such that a portion of headgear fits in a space defined between the bottom of body, the upper mandible, and two side wings of the body and the portion of the headgear presses against the first face of the upper mandible lip.

19. The storage device of claim 18, wherein the portion of the headgear comprises one of an adjustment knob, and a back of a headgear band.

20. The storage device of claim 18, wherein the upper mandible and lower mandible defined a space therebetween configured to accommodate safety gloves.

* * * * *